ature Patented Jan. 9, 1968

3,362,913
PROCESS FOR THE MANUFACTURE OF NON-DUSTY SEED-LIKE AGGREGATES
William Douglas Bale and Alfons Anzelm Komander, Manchester, England, assignors to Imperial Chemical Industries Limited, London, England, a corporation of Great Britain
No Drawing. Filed May 25, 1964, Ser. No. 370,070
Claims priority, application Great Britain, May 31, 1963, 21,935/63
15 Claims. (Cl. 252—182)

This invention relates to a process for the manufacture of non-dusty seed-like aggregates of solid organic chemical substances, and particularly of those organic chemical substances which are useful as compounding ingredients in the manufacture of natural or synthetic rubber compositions.

It has been proposed to manufacture organic chemical substances in a form which does not produce undesirable dust during transport or use by treatment with binding agents and forming the treated substances into pellets, granules or other agglomerated forms. This pelleted form however is not entirely satisfactory since if the pellets have sufficient mechanical strength to avoid break-down during transport or storage it is frequently difficult to disperse or reduce the pellets to a powder form during use.

It has now been found that if an aqueous suspension of a powdered organic compound is stirred with a condensation product of sulphur and aniline the organic compound and sulphur/aniline condensate form non-dusty seed-like aggregates, which are sufficiently robust to undergo storage and handling without breakdown, which are free-flowing and therefore easily handled, and which disperse readily, thus facilitating their use, for example as chemicals for use in rubber compounding.

Thus according to the invention there is provided a process for the manufacture of non-dusty seed-like aggregates of organic chemical substances which comprises stirring the same organic chemical substances in suspension in an aqueous medium with a condensation product of sulphur and aniline.

The sulphur/aniline condensation products used in the process of the invention comprise dithiobisaniline and are well known in the art as exemplified for instance in U.S. Patent 2,435,508. They are prepared for example by heating aniline and sulphur, preferably in molar proportions between 1:1 and 1:2.5, at elevated temperatures, preferably about 225–230° C. although somewhat higher temperatures, or lower temperatures such as 160° C. especially in presence of a catalyst such as iodine, or higher ratios of aniline to sulphur may be used if desired.

These condensation products are preferably used in the form of aqueous emulsions or dispersions which may be prepared by methods known in the art, for example by stirring the condensation product, preferably dissolved in an organic solvent such as toluene, with water optionally containing a dispersing agent.

When the aqueous suspension also contains electrolytes, for example inorganic salts such as sodium chloride or sodium sulphate, which will frequently be the case when the suspension has been obtained by adding to water the reaction mixture wherein the organic compound has been manufactured, it is desirable to add in addition surface active agents, for example Turkey red oil, sulphated fatty acid esters, alkylated phenol ethylene oxide condensates, sodium lauryl sulphate, or sodium dodecyl benzenesulphonate, or mixtures of these in amount from 0 to 20% of the weight of the binding agent and preferably from 2 to 5% of the weight of the binding agent.

If desired there may also be other substantially water-insoluble compounds, for example long chain carboxylic acids such as stearic acid, long chain alcohols such as cetanol, or low-melting waxes such as paraffin wax in amount from 0 to 10% of the weight of the product to be granulated. Addition of these other water-insoluble compounds gives easier control of the size, and particularly the uniformity of size, of the seed-like aggregate, and also results in material of easier dispersibility for example in rubber.

The stirring may be carried out at any convenient temperature and is preferably carried out at a temperature at or above the softening point of the aggregate followed by cooling below the softening point when aggregates of the desired size have been formed.

The seed-like aggregates may be isolated by for example filtration and then dried in any convenient manner.

The proportion of aniline/sulphur condensate to be employed is preferably betwen 5 and 20% by weight of the organic compound but larger quantities may be used if desired.

As examples of substances which may be prepared in non-dusty seed-like aggregates by the process of our invention there may be mentioned for example vulcanization accelerators, retarders and antioxidants and pigments. There may particularly be mentioned 2-mercaptobenzthiazole, N - cyclohexylbenzthiazyl - 2 - sulphenamide, N-tertiary - butylbenzthiazyl - 2 - sulphenamide, N - tertiary-octylbenzthiazyl - 2 - sulphenamide, tetramethylthiuram disulphide, tetraethyl thiuram disulphide, zinc diethyldithiocarbamate, diphenylguanidine, di-o-tolylguanidine, the zinc salt of 2-mercaptobenzthiazole and mixtures of these compounds and particularly dibenzthiazyl disulphide.

The seed-like aggregates prepared according to the process of our invention possess excellent stability under the conditions encountered during storage, transport and use. For example the formation of dusty particles under such conditions is negligible, thus minimizing the health hazard and other disadvantages caused by dusty materials. Furthermore the aggregates are free-flowing and are therefore easily handled and particularly suitable when automatic feeding machines and similar apparatus are employed.

These seed-like aggregates are particularly easy to break down under the conditions commonly employed for the subsequent use of the substances concerned. Thus for example those which are intended for use in the compounding of rubber compositions may be dispersed with exceptional ease into the rubber mix during milling.

The invention is illustrated but not limited by the following examples in which the parts and percentages are by weight.

EXAMPLE 1

88 parts of dibenzthiazyl disulphide prepared as an aqueous suspension by chlorinating a solution containing approximately 102 parts of the sodium salt of 2-mercaptobenzthiazole in 1000 parts of water, are treated with 0.3 part of sulphated methyl oleate before adjusting the pH to between 4 and 5 with aqueous hydrochloric acid and raising the temperature to between 85 and 90° C.

4 parts of stearic acid are dissolved in water at a temperature between 65° and 70° C. by the addition of caustic soda. To this is charged with vigorous agitation, 8 parts of the condensation product of aniline and sulphur dissolved in 11 parts by weight of hot toluene.

The resulting emulsion is charged to the disulphide slurry, the pH readjusted to between 4 and 5 by the addition of hydrochloric acid and the temperature maintained at between 85° and 90° C. with efficient agitation throughout. Aggregation occurs and is complete after approximately 30 minutes. The suspension is then cooled, filtered, and the seed-like aggregates so obtained washed with water, and dried at 70° C.

The condensation product of aniline and sulphur used above is prepared by heating aniline and sulphur in the molar ratio of 1:2 at 225° C. for 9 hours in an autoclave, followed by steam distillation to remove unreacted aniline.

EXAMPLE 2

88 parts by weight of dibenzthiazyl disulphide, prepared as an aqueous emulsion described in Example 1, are treated with hydrochloric acid to bring the pH to between 4 and 5. The temperature is raised to between 85 and 90° C.

12 parts by weight of the condensation product of aniline and sulphur as described in Example 1 are dissolved in 11 parts by weight of hot toluene. This solution is poured with vigorous agitation, into water at a temperature between 65 and 70° C. containing sulphated methyl oleate as dispersing agent.

The resulting emulsion is charged to the disulphide suspension. Efficient agitation is maintained throughout keeping the pH between 4 and 5 and the temperature at between 85 and 90° C. Aggregation occurs and after approximately 30 minutes the product is in the form of fine beads. The suspension is cooled, filtered, and the seed-like aggregates so obtained washed chloride free with water, and dried at 70° C.

What we claim is:
1. A process for the manufacture of non-dusty seed-like aggregates of a powdered organic chemical substance comprising a solid vulcanization compounding ingredient for use in the production of rubber compositions comprising suspending said powdered solid vulcanization compounding ingredient in an aqeous medium and stirring said resulting suspension with a condensation product of sulfur and aniline comprising dithiobisaniline to produce said seed-like aggregates.

2. The process as claimed in claim 1 wherein the powdered organic chemical substance is a vulcanization retarder.

3. The process as claimed in claim 1 wherein the powdered organic chemical substance is a vulcanization antioxidant.

4. The process as claimed in claim 1 wherein the powdered organic chemical substance is a vulcanization pigment.

5. A process as claimed in claim 1 wherein the condensation product of sulphur and aniline is obtained by heating aniline and sulphur in molar proportion between 1:1 and 1:2.5.

6. A process as claimed in claim 1 wherein the condensation product of aniline and sulphur is used in the form of an aqueous dispersion.

7. A process as claimed in claim 6 wherein the aqueous dispersion is obtained by dissolving the condensation product of aniline and sulphur in an organic solvent and adding the solution to water.

8. A process as claimed in claim 7 wherein the dispersion is prepared in presence of a dispersing agent.

9. A process as claimed in claim 1 wherein the condensation product of sulphur and aniline is used in amount between 5 and 20% by weight of the amount of powdered organic chemical substance.

10. A process as claimed in claim 1 wherein there is added to the aqueous medium a surface active agent.

11. A process as claimed in claim 1 wherein there is added to the aqueous medium another substantially water-insoluble compound selected from the group consisting of long chain carboxylic acid, long chain alcohol and low-melting wax in amount from 0 to 10% of the weight of powdered organic chemical substance.

12. A process as claimed in claim 1 wherein the stirring is carried out at a temperature at least at the softening point of the aggregate followed by cooling below the softening point.

13. Non-dusty seed-like aggregates of powdered organic chemical substances prepared by the process of claim 1.

14. A process as claimed in claim 1 wherein the powdered organic chemical substance is a vulcanization accelerator.

15. The process as claimed in claim 14 wherein the vulcanization accelerator is selected from the group consisting of 2-mercaptobenzthiazole, N-cyclohexylbenzthiazyl-2-sulphenamide, N - tertiary-butylbenzthiazyl-2-sulphenamide, N-tertiary-octylbenzthiazyl-2-sulphenamide, tetramethylthiuram disulphide, tetraethylthiuram disulphide, zinc diethyldithiocarbamate, diphenylguanidine, di-o-tolylguanidine, the zinc salt of 2-mercaptobenzthiazole, dibenzthiazyl disulphide and their mixtures.

References Cited

UNITED STATES PATENTS 2,435,508  2/1948  Paul et al. _____ 260—582
3,158,615  11/1964  Dunn et al. _____ 260—283

JOSEPH L. SCHOFER, *Primary Examiner.*

D. K. DENENBERG, *Assistant Examiner.*